May 23, 1933. L. B. McWILLIAMS ET AL 1,910,623
INSECT DESTROYER
Filed Dec. 21, 1931 2 Sheets-Sheet 2
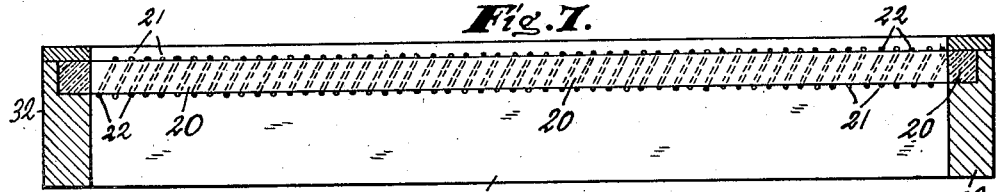
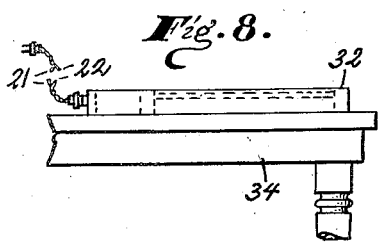
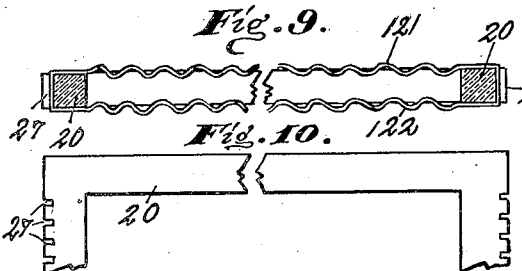
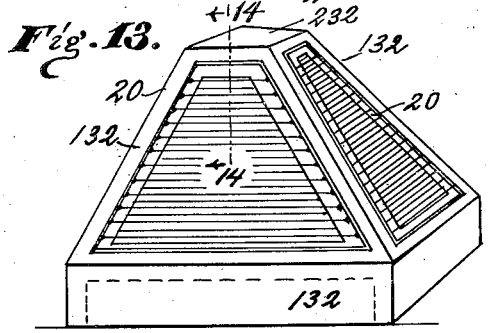
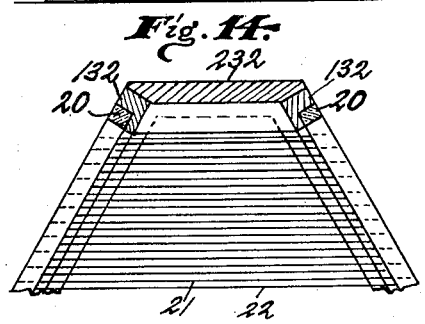
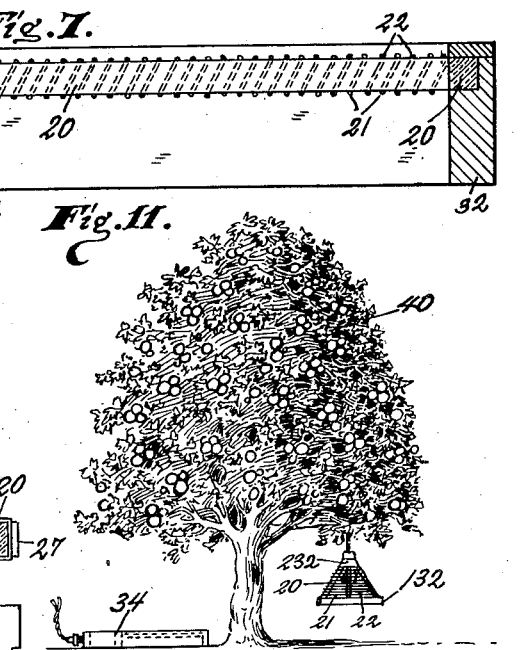
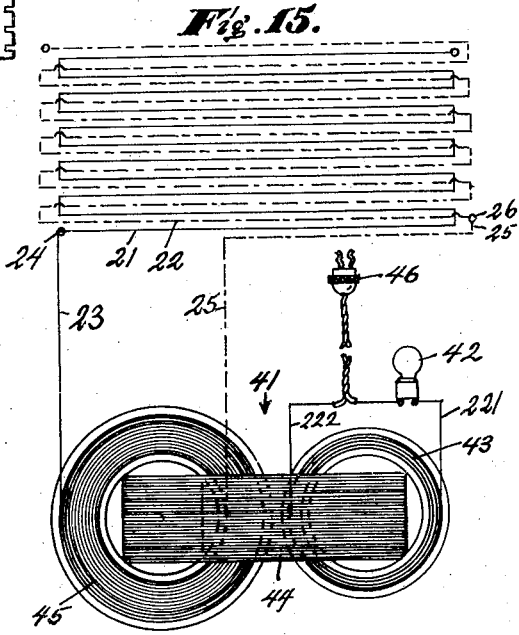
Inventors.
Leigh Brown McWilliams.
Lyle Virgil McWilliams.
By
Lockwood & Lockwood
Their Attorneys.

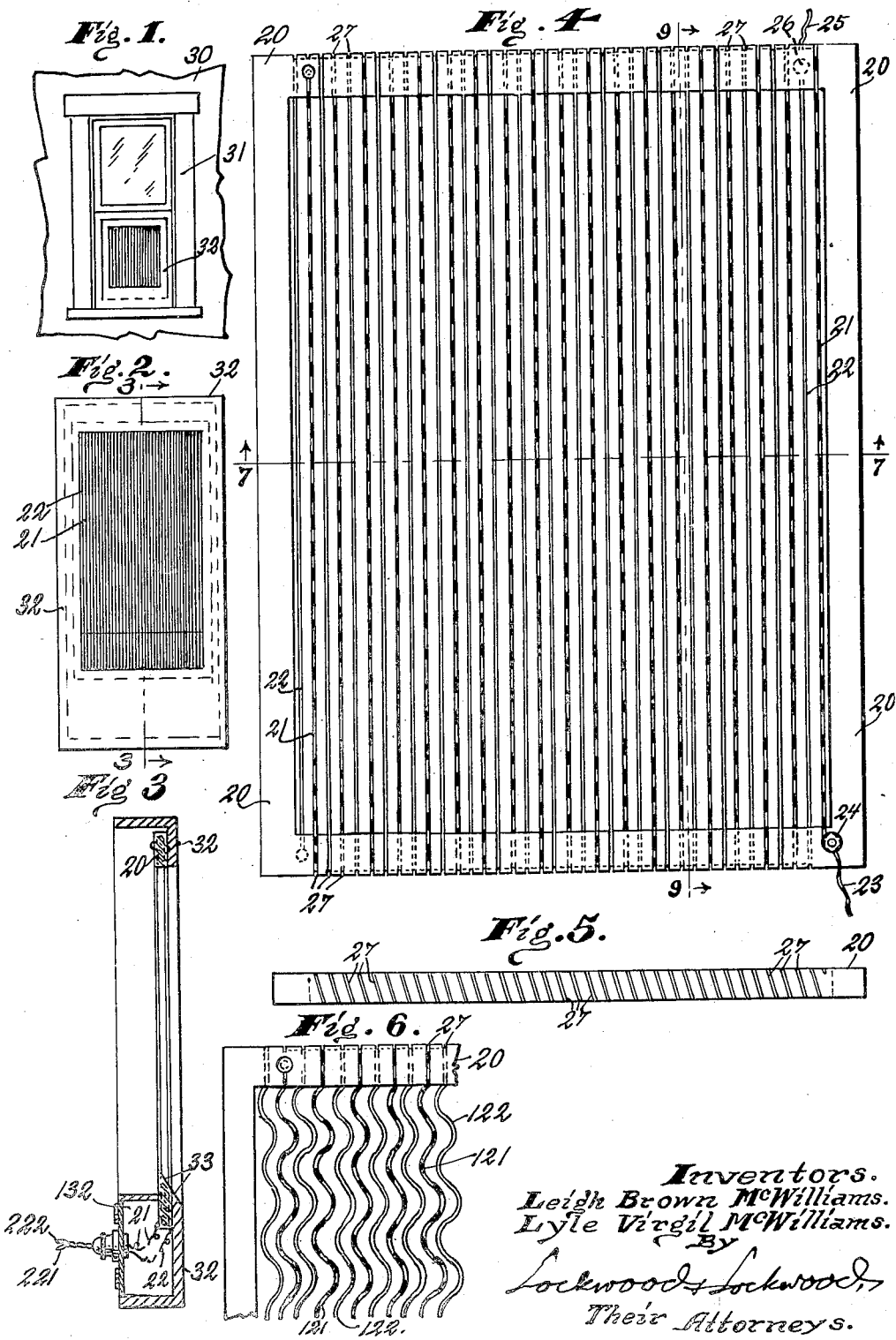

Patented May 23, 1933

1,910,623

UNITED STATES PATENT OFFICE

LEIGH BROWN McWILLIAMS AND LYLE VIRGIL McWILLIAMS, OF WHITTIER, CALIFORNIA

INSECT DESTROYER

Application filed December 21, 1931. Serial No. 582,330.

The object of this invention is to provide a practical and useful electric insect destroyer adapted for use in residences and other buildings and in gardens, orchards and outdoors. The insects are killed by reason of them closing electric circuits.

One feature of the invention consists in providing positive and negative electric wires which are so near each other as to be bridged by an insect and thus the circuit closed through the insect, and the wires are substantially in staggered relation to each other so as to increase materially the hazard of insects that may come in contact therewith.

One way of carrying out the foregoing feature of the invention is by winding parallel positive and negative wires around a thin annular frame so the wires on opposite sides of the frame will be near each other. Also said wires cross the ends of the frame obliquely so as to obtain the staggered effect. Another way is to arrange a plurality of wired frames in pyramidal form.

Other features of the invention consist in using undulatory circuit wires under tension so as to diminish the tendency of the wires to relax and contact with each other and short-circuit the apparatus; mounting said circuit wires on a frame adapted to be independently handled and located wherever desired, or a plurality of said frames to be built or inserted in a single master frame or structure; and the use of a transformer provided with a fuse in the form of an incandescent lamp which is readily removed and replaced.

The foregoing and other features of the invention will be more fully understood from the accompanying drawings and the following description and claims:

In the drawings:

Figure 1 is a side elevation of a section of a building including a window equipped with one form of said insect destroyer. Fig. 2 is a diagrammatic plan view of the insect destroyer detached from the window. Fig. 3 is a central vertical section through the insect destroyer as indicated by line 3—3 in Fig. 2. Fig. 4 is an elevation of the annular wired frame shown in Figs. 1 to 3, but on a larger scale. Fig. 5 is a plan view of the upper end of the frame in Fig. 4. Fig. 6 is an elevation of a modified form corresponding to the upper left hand corner portion of the circuit wire frame shown in Fig. 4. Fig. 7 is a horizontal section through the insect destroyer frame on the line 7—7 of Fig. 4. Fig. 8 is a side elevation of a portion of a table and one form of the insect destroyer resting thereon in position for use. Fig. 9 is a horizontal section of a wired frame with the wires wound on the frame being undulatory. Fig. 10 is a plan view of one end of the frame shown in Fig. 9 without the wiring. Fig. 11 is an elevation of a tree with one form of the insect destroyer suspended therefrom and another form lying flat upon the ground. Fig. 12 is a diagram showing a preferred form of arranging the wiring in staggered relation so that each insect is exposed to a plurality of hazards while attempting to pass through the frame.

Fig. 13 is a perspective view of an insect destroyer in a pyramidal form. Fig. 14 is a vertical section through a portion of the form shown in Fig. 13 on the line 14—14. Fig. 15 is a diagram of the wiring of the insect destroyer connected with a source of electricity including a transformer and with an incandescent lamp fuse to protect the transformer from high voltage.

In the form shown in Figs. 1 to 8 the insect destroyer construction includes a thin rectangular annular frame 20 formed of insulating material and around which a positive wire 21 and a negative wire 22 are wound with said wires parallel and relatively near each other, as shown. The current comes into wire 21 at the portion 23 adjacent the binding post 24 and the current leaves wires 22 at the end 25 adjacent the binding post 26. These wires 21 and 22 are close enough to each other to be bridged by the body of an insect thereon, and thus the insect killed by the current through the circuit completed by the insect.

In order to improve considerably the device and increase the hazard of insects coming in contact with wires 21 and 22, the wires are preferably wound obliquely over the ends of frame 20, as shown in Figs. 4 and 5. To that end there are oblique grooves 27 for receiving the wires, and thus stagger the wires on the opposite sides of said frame, as shown in Fig. 12. Thus the wires 21 and 22 on the two sides of the frame are staggered with reference to the corresponding wires on the opposite side of the frame, as shown in Fig. 12. That is, the wires 21 as shown by the grooves in Fig. 5 cross diagonally from one side to the other side and the wires 22 parallel therewith do the same, and therefore the wires on the back side of the frame would be in a staggered position between the wires on the front side of the frame, as indicated in Fig. 12.

The object of this feature of construction, therefore, is manifest as shown in Fig. 12, as it minimizes the chance of flies or other insects to escape or to pass through the wiring without being killed. In other words, the insects are thus exposed to three hazards in an effort to go through the wiring. This mode of wiring the frame 20 is a very simple one as it only requires the two parallel wires to be continuously wound around the ends of the frame, as shown.

After the frame 20 is wound, as shown in Fig. 4, it may be used in various situations. For instance, in Fig. 1 there is shown a building wall 30 with a window frame 31 and in the place of the lower sash there is inserted an insect destroyer frame 32 in which the frame 20 is removably mounted. In this position of the device insects in endeavoring to enter the room of the building will be caught and killed.

The construction of the frame 32 is preferably shown in Fig. 3 where it appears in angle form in cross section and to the inner flange thereof the insulating wired frame 20 is secured. In the lower part of the frame 32, shown in Fig. 3, there is a chambered section 132 for mounting the electric wiring 221 and 222, and preferably the bottom portions of the frames 20 and 32 are beveled at 33 to provide an outwardly and downwardly inclined surface to deflect outwardly the insects that fall down from the wiring.

The form of the device shown in Figs. 1 to 5 can also be used on a cook-table or other table 34, as shown in Fig. 8, or it can be placed on the ground over an ant hill, as shown in Fig. 11.

Instead of straight wires 21 and 22, undulatory wires 121 and 122 may be employed as shown in Figs. 6 and 9. In a long wiring arrangement as shown in Fig. 4 the wires may sag and possibly contact with each other at some point and thus short-circuit the device. By employing undulatory wires as shown in Figs. 6 and 9, which are constantly under tension, this result will be avoided.

There is shown in Figs. 13 and 14 pyramidal frames 232 in connection with which the frames 20 and 132 may be mounted. In this the wiring is substantially as shown in Fig. 3. This downward inclination further increases the hazard to the insects over that in the arrangement illustrated in Fig. 12, and this is particularly useful under fruit trees, such as the tree 40, from a branch of which the tapering form 232 of the insect destroyer is shown suspended.

One peculiarity about the use of this sort of insect destroyer is that when one or more insects have been killed and are clinging to the wiring the odor created by the dead insects will attract other insects and thus facilitate in the destruction thereof by this apparatus.

Fig. 15 shows the wires 21 and 22 connected with the source of electricity through a transformer 41 which is provided with a fuse 42 in the form of a small incandescent lamp. This protects the transformer from excessive voltage and the fuse can very readily be removed and replaced. There is a primary winding 43, armature 44 and secondary winding 45. This transformer is plugged into an electric supply socket (not shown) by the plug 46, and the wires 21 and 22 are connected by wires 23 and 25 with said secondary winding 45.

The short-circuiting effected by an insect on the exposed part of the wires will not burn out the transformer in practice even when short-circuiting by a metal tool or object would burn out the transformer.

As noted in Figs. 2 and 3, the wires on the insulating frames 20 are protected by the flanged part of frame 32, see Fig. 2, so that the electrocuted insects will come in contact only with the exposed part of the wires and will not collect on the insulating frame 20. The wires on the insulator will be protected from any moisture so that the wires will not corrode and eventually short-circuit the wires to such an extent that the insect destroyer power is lost.

We claim as our invention:

1. An electric destroyer including an annular frame of thin insulating material having oblique grooves in the ends thereof, and a pair of parallel independent positive and negative electric wires wound around said frame so as to provide closely related wires on each side of said frame and crossing through the grooves in the ends of said frame at an inclination that locates the wires on the two opposite sides of said frame in staggered relation to each other, whereby an insect lodging thereon will bridge and close the circuit through adjacent parallel wires on the same side of the frame or on opposite sides of the frame or between the wires of the two sides thereof.

2. An electric insect destroyer including an annular frame of thin insulating material having oblique grooves in the ends thereof, and a pair of parallel independent positive and negative undulatory electric wires extending crosswise of said frame and through the grooves in the ends thereof so as to extend on both sides of said frame so that a positive wire on one side of the frame is opposite a negative wire on the other side of the frame, whereby the circuit through said wires may be closed by an insect bridging the two wires at either side or between wires on opposite sides of the frame.

3. An insect destroyer including an upwardly tapering main frame with a plurality of sides, and a wired frame secured in each side of said tapering frame, each wired frame being composed of insulating material with oblique grooves in the sides thereof, and a pair of parallel independent positive and negative electric wires wound around each of said insulation frames and through said grooves thereby providing a series of wires on the opposite sides of said frames, means for supplying electricity to the positive windings of each frame, whereby the insects lodging thereon will bridge and close the circuit through adjacent positive and negative wires.

In witness whereof, we have hereunto affixed our signatures.

LEIGH BROWN McWILLIAMS.
LYLE VIRGIL McWILLIAMS.